Figure 1:
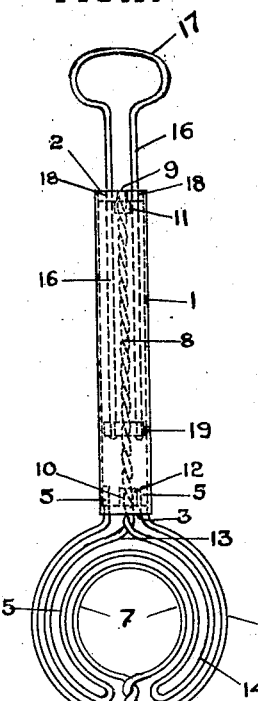

W. DUPRÉ.
EGG BEATER.
APPLICATION FILED SEPT. 11, 1909.

991,432.

Patented May 2, 1911.

WITNESSES
George T. Tribe
Irene M. Knight

INVENTOR
WILFRED DUPRÉ
BY ATTY.
O. H. Taft

UNITED STATES PATENT OFFICE.

WILFRED DUPRÉ, OF WORCESTER, MASSACHUSETTS, ASSIGNOR TO CHARLES L. LEONARD AND JOHN W. BRITTAIN, BOTH OF WESTBORO, MASSACHUSETTS.

EGG-BEATER.

991,432.            Specification of Letters Patent.        Patented May 2, 1911.

Application filed September 11, 1909. Serial No. 517,315.

*To all whom it may concern:*

Be it known that I, WILFRED DUPRÉ, a citizen of the United States of America, residing at Worcester, in the county of Worcester and Commonwealth of Massachusetts, have invented certain new and useful Improvements in Egg-Beaters, of which the following is a specification.

My invention relates to egg beaters and more particularly to that class of egg beaters wherein rotating arms are provided, together with mechanical means for operating said arms.

Heretofore great difficulty has been experienced in providing such a beater adapted to withstand the wear and tear of every-day use, and at the same time be simple and cheap enough to be easily manufactured and placed upon the market at a low cost.

My invention has for its object, to provide a device which shall overcome these disadvantages and to provide an egg beater which is simple to operate, easily and cheaply constructed and readily assembled, but at the same time one which is durable and more effective in operation than those of similar nature now in use.

With the foregoing and other objects in view, my invention consists of such details of construction and combination of parts as will be hereinafter more fully described and specifically pointed out in the claim.

In describing my invention in detail, reference will be had to the accompanying drawings, in which like reference characters denote like or corresponding parts, in which—

Figure 2:
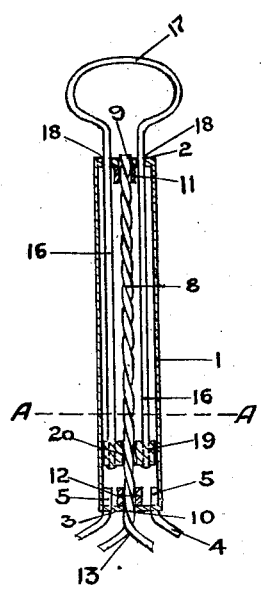
Figure 3:
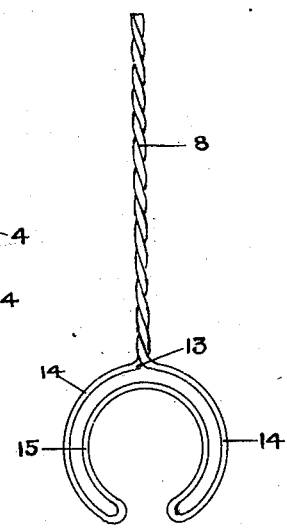
Figure 4:
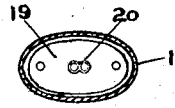
Figure 5:

Figure 1 is a view in side elevation of my improved egg beater, showing in dotted lines the mechanism for rotating the beater arms. Fig. 2 is a detail sectional view taken longitudinally of the casing 1, and showing the mechanism for rotating the beater arms. Fig. 3 is a view in side elevation, showing the beater arms and a spindle connected thereto. Fig. 4 is a detail sectional view taken on the line A—A of Fig. 2 showing the slidable nut, and, Fig. 5 is a detail view illustrating the cap which is applied to the upper end of the casing.

In carrying my invention into practice, I provide a casing 1, which is shown in the drawings as being elliptical in cross-section. It will be understood however, that this shape is given to the casing for the purpose of preventing the nut 19 from rotating, any other shape being used as occasion may warrant, provided some means is present to hold said nut in its normal position.

The casing is equipped with caps 2 and 3 which fit over the ends of said casing and close the same. A guard wire 4 has its opposite ends extending through holes 5 in the lower cap 3, said ends being suitably fastened in position. The guard 4 is circular in form and has at its lowermost portion, an upward extension 6 which is shown as being twisted, although this latter feature is an immaterial point. At the upper end of the extension 6, the guard wire is again formed into a circle 7, which is somewhat smaller than the outer circle 4 and is concentric therewith.

Extending longitudinally of the casing 1, and journaled in the caps 2 and 3, is a spindle 8, preferably formed of twisted wire, although a helical screw may be employed in place of the construction illustrated. Said spindle 8 passes through a hole 9 in the cap 2, and through a hole 10 in the cap 3, collars 11 and 12 being fixed upon said spindle beneath and above the caps 2 and 3 respectively, in order to prevent said spindle from being displaced vertically.

The lower end of the twisted wire spindle 8 is formed into semicircular diverging arms 14, which extend to points in proximity to the member 6 of the guard wire and at said point are doubled back upon themselves to form an inner open circle 15, which is spaced apart from the outer open circle formed by the semicircular arms 14. It will be seen that the arms 14 and the circle 15 are adapted to rotate between the outer circle 4, formed by the guard wire, and the circle 7 also formed by said guard.

I provide two rods 16, 16 which are adapted to slide through apertures 18, 18 in the cap 2, said rods 16, 16 being bent at their upper extremities into a suitable handle 17. Mounted upon the spindle 8 and engaging the strands of wire forming said spindle, each of which strands is twisted into a helical form, is a nut 19, said nut being slidable within the casing, the spindle 8 passing through an aperture 20 in said nut. The rods 16, 16 are embedded in the nut in such manner that when the handle 17 is reciprocated, the nut 19 is raised and lowered in said casing, the spindle 8 being rapidly rotated by this reciprocatory motion.

It is thought that the operation of my device will be readily understood from the foregoing description, but it is pointed out that a great advantage over other similar devices, is obtained by the beater arms being made double and the guard wires being disposed both outside and inside of said beater arms, for when the substance being beaten impinges upon the members 4, 7, 14 and 15, a froth will be readily produced.

From the foregoing, it will be seen that I have provided an egg beater which is easily and cheaply constructed and readily assembled, and at the same time one which is durable and more effective in use than any heretofore produced.

It will be understood that slight changes in construction may be resorted to without deviating from the spirit and scope of my invention.

I claim:

An egg beater comprising a spindle made of twisted wires, semi-circular beater arms extending from the spindle and doubled back, a tubular casing inclosing the spindle, a plate at each end of the casing, said spindle being journaled in the plates, collars secured to the spindle near the inside face of said plates to prevent vertical displacement of the spindle, a nut engaging the spindle and slidable on the inside of said casing, rods fixed in the nut and extending longitudinally in the casing forming a handle whereby movement is given to the nut and the spindle rotated, a guard fastened in the lower plate, the guard being in circular form extending outside of the arms, and the guard having an extension passing between the ends of the beater arms and forming a circle inside the said arms.

In testimony whereof, I affix my signature in the presence of two witnesses.

WILFRED DUPRÉ.

Witnesses:
O. A. TAFT,
IRENE M. KNIGHT.

---

Copies of this patent may be obtained for five cents each, by addressing the "Commissioner of Patents, Washington, D. C."